United States Patent [19]

Munshaw

[11] 4,418,268
[45] Nov. 29, 1983

[54] SOLDERING IRON HOLDER WITH READY INDICATOR AND SAFETY SHUTOFF

[76] Inventor: Harold A. Munshaw, 2624 Starr Rd., Pennsauken, N.J. 08109

[21] Appl. No.: 227,439

[22] Filed: Jan. 22, 1981

[51] Int. Cl.³ .......................... H05B 1/02; B32K 3/02
[52] U.S. Cl. ................................. 219/242; 219/240; 219/247; 219/248; 219/259; 219/492; 219/506; 248/117.2
[58] Field of Search .............. 219/241, 242, 240, 257, 219/259, 247, 248, 492, 493, 506; 248/117.2; 228/51-53, 55, 57

[56] References Cited

U.S. PATENT DOCUMENTS

| | | | |
|---|---|---|---|
| 1,496,699 | 6/1924 | Wooden | 219/259 |
| 2,248,486 | 7/1941 | Birk | 248/117.2 |
| 2,543,103 | 2/1951 | Friesen | 219/242 |
| 4,203,101 | 5/1980 | Townsend | 219/257 X |
| 4,241,290 | 12/1980 | Folland | 219/242 X |
| 4,243,875 | 1/1981 | Chang | 219/240 X |
| 4,278,870 | 7/1981 | Carletom et al. | 219/242 X |

Primary Examiner—A. Bartis
Attorney, Agent, or Firm—Duffield & Lehrer

[57] ABSTRACT

A soldering iron holder includes a box-shaped housing having mounted thereon a support supporting an electric soldering iron while not in use. A manually actuated power switch on the housing applies electric power to a soldering iron supported by the support means to heat the iron to operating temperature. An indicator arrangement carried by the housing is controlled by a first timing circuit in the housing and activated concurrently with operation of the power switch. The indicator arrangement includes an "iron heating" LED which is extinguished and an "iron ready" LED which is illuminated and an audible alarm which is sounded by the first timing circuit after lapse of a preset, predetermined time duration, e.g., five minutes, sufficient for the soldering iron to reach operational temperature. A second resettable timing circuit is provided in the housing and activated concurrently with operation of the power switch to deactivate the power switch if the soldering iron remains idle on the support for a predetermined extended time period, e.g., two hours, after the power switch is activated, to prevent the soldering iron from being inadvertently left on. The support is provided with a soldering iron use sensor, such as a photosensor, magnetic switch, or weight switch, for sensing the removal of the soldering iron from the support and automatically resetting the second timing circuit each time the soldering iron is removed from the support.

4 Claims, 4 Drawing Figures

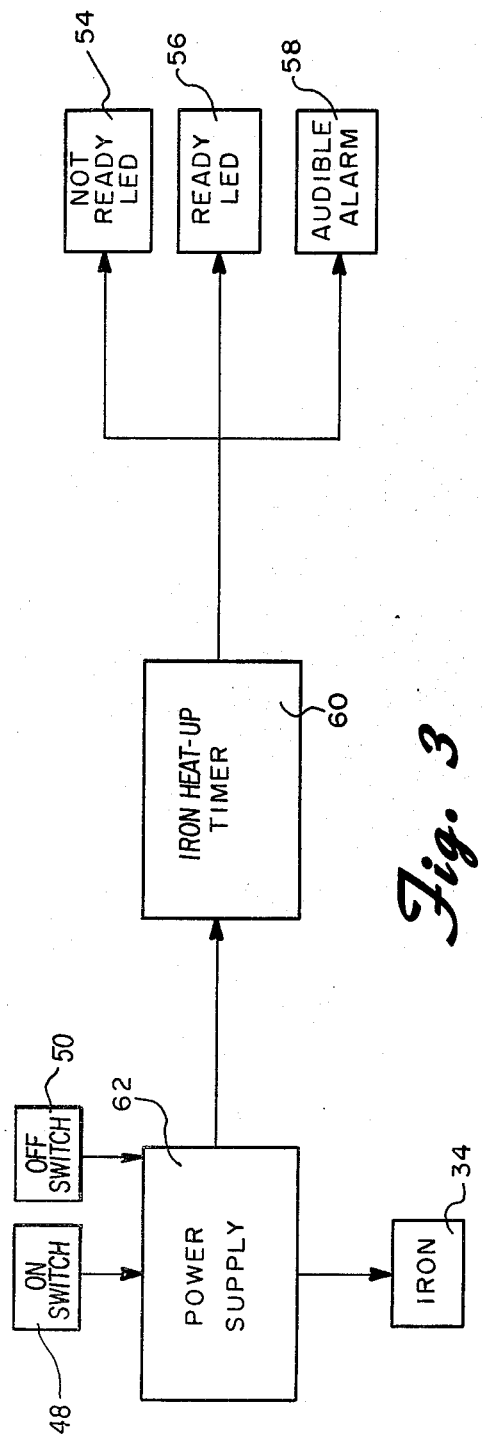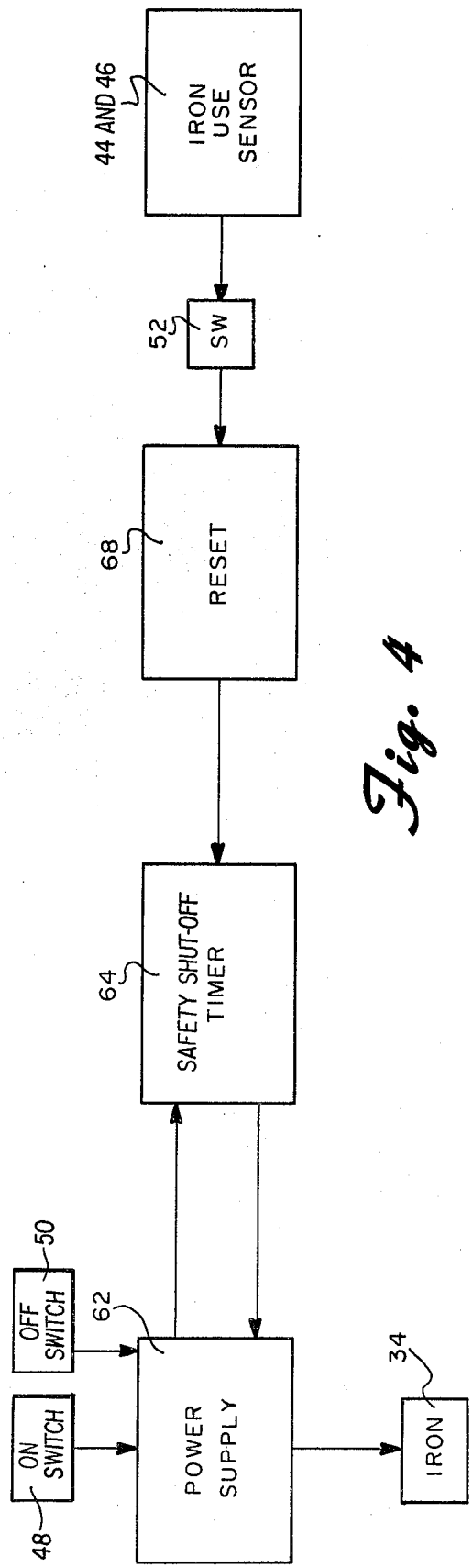

SOLDERING IRON HOLDER WITH READY INDICATOR AND SAFETY SHUTOFF

BACKGROUND OF THE INVENTION

The present invention is directed toward a soldering iron holder and more particularly toward a soldering iron holder which includes a housing and electronic circuit means within the housing for controlling the operation of the soldering iron.

Anyone who has ever used a soldering iron has undoubtedly experienced the annoying problem of anxiously waiting for the iron to heat up and periodically testing the iron to see if it is ready for use. Insofar as Applicant is aware, there are no devices presently available on the market nor has anyone ever proposed a device for eliminating this annoyance.

Another and unquestionably more serious problem faced by users or soldering irons is that of inadvertently leaving the iron on. It is not uncommon for one using a soldering iron to be distracted or called away from his work and inadvertently forget to return to the same to turn the iron off. This not only is a waste of electrical power but can also create a serious safety hazard.

Soldering iron holders have been proposed in the past. Representative holders are described, in example, in U.S. Pat. Nos. 2,248,486; 2,475,941; 2,494,840 and 2,543,103. None of these patented devices, however, are directed toward the problems described above. In each of the patented devices, the holder merely provides a support or rest for the soldering iron and reduces the power to the iron when the iron is supported on the holder. These prior devices do not turn the soldering iron off when the same is not in use nor do they have any means for indicating when the iron is ready for use.

SUMMARY OF THE INVENTION

The soldering iron holder of the present invention eliminates the problems described above which problems are not even recognized by the prior patents known to Applicant. The soldering iron holder of the present invention includes a housing having a support mounted thereon for supporting the iron. Electronic circuit means located within the housing control the operation of the soldering iron. A first timing circuit is initiated when the power switch is turned on. After a preset time which is predetermined to be sufficient to allow the iron to reach operating temperature, an "iron heating" light is extinguished and on "iron ready" light goes on. A second timing circuit is initiated each time the iron is put in use and turns the power off if the iron remains idle for a predetermined extended period of time thereby preventing the iron from being inadvertently left on.

BRIEF DESCRIPTION OF THE DRAWING

For the purpose of illustrating the invention, there is shown in the accompanying drawing one form which is presently preferred; it is being understood that the invention is not intended to be limited to the precise arrangements and instrumentalities shown.

FIG. 3 is a schematic block representation of an "iron ready" timing circuit forming part of the circuitry of the present invention, and FIG. 4 is a schematic block diagram of a circuit which turns an iron off when the same is unused for a predetermined period of time.

DETAILED DESCRIPTION OF THE PREFERRED EMBODIMENT

Figure 1:
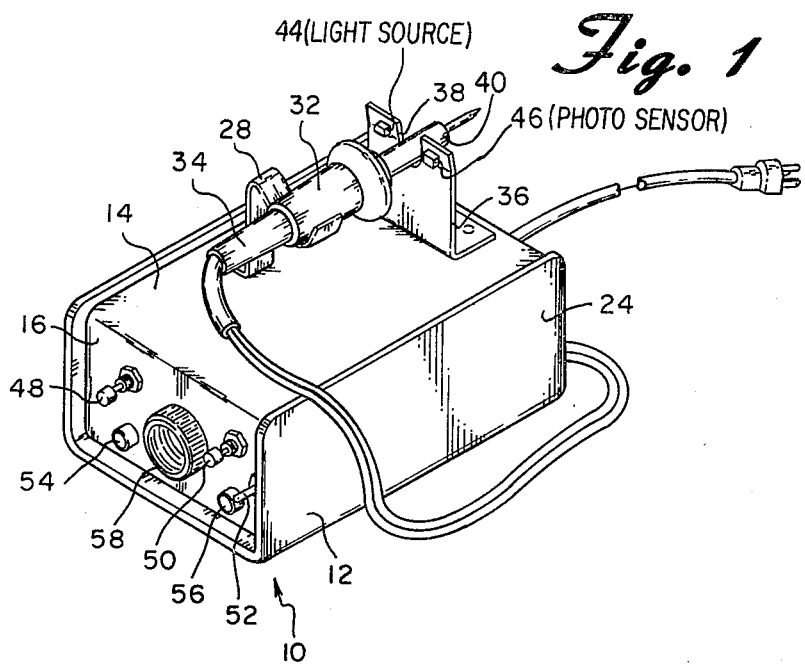
FIG. 1 is a perspective view of a soldering iron holder constructed in accordance with the principles of the present invention.
Figure 2:
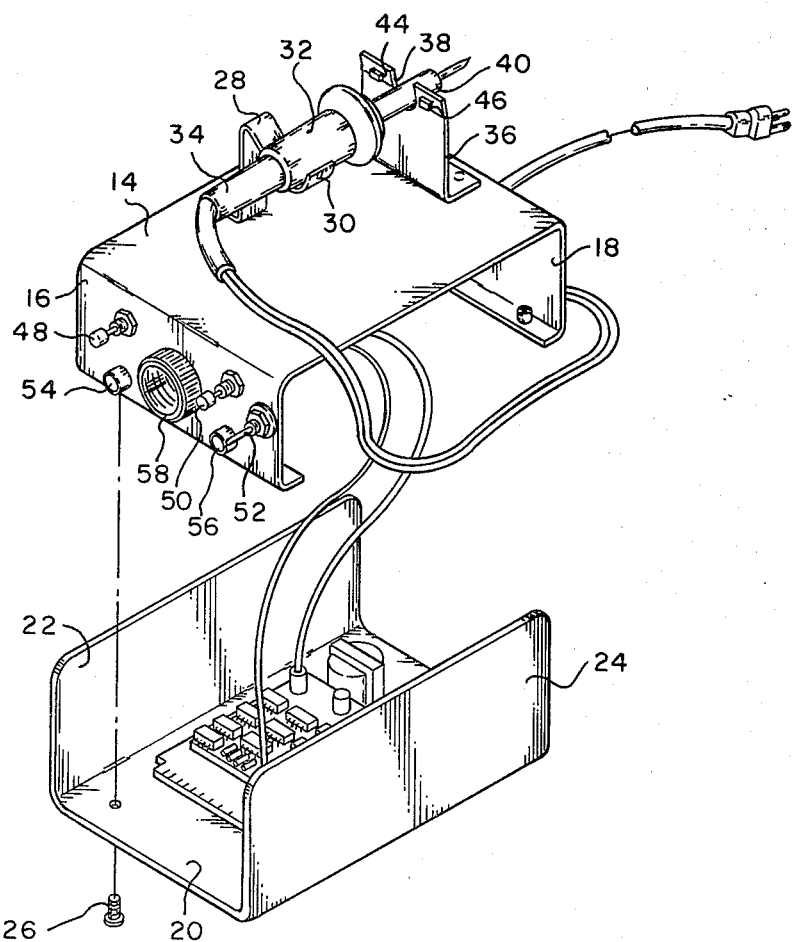
FIG. 2 is a perspective view similar to FIG. 1 but showing the housing separated to expose the component parts of the circuitry contained therein.

Referring now to the drawing in detail wherein like reference numerals have been used throughout the various figures to designate like elements, there is shown in FIG. 1 a perspective view of a soldering iron holder constructed in accordance with the principles of the present invention and designated generally as 10. Soldering iron holder 10 includes a substantially rectangular box-shaped housing 12 which is preferably comprised of two parts. The first part consisting of upper wall 14 which carries downwardly depending front wall 16 and rear wall 18 (see FIG. 2). The second half of the housing 12 consists of bottom wall 20 and upstanding side walls 22 and 24. The two housing sections are joined together by a plurality of sheet metal screws such as shown at 26 in a conventional manner well known in the art.

Mounted on the upper surface of the top wall 14 is a soldering iron support means. The support means is also preferably in two parts for added stability. The first part is comprised of a sheet metal bracket 28 having its free end formed into a U-shape 30 to support the handle 32 of a soldering iron 34. An L-shaped sheet metal bracket 36 extends upwardly from the rear of the upper surface of top wall 14 and includes a notch or cutout 38 on the top thereof. The forward end 40 of the soldering iron 34 fits into the notch 38.

For reasons which will become apparent hereinafter, the upper end of bracket 36 carries a sensor which may be comprised, for example, of a light emitting diode or other light source 44 and a light sensitive or responsive device 46 which could be, for example, a photodiode or the like. The light source 44 is mounted on the bracket 36 on one side of the notch 38. The light responsive device 46 is mounted on the other side of the notch and in alignment with the light source 44. Thus, when the iron 34 is supported by the support means, light is prevented from passing between the source 44 and the light responsive means 46. However, when the soldering iron 34 is removed from the support, the light responsive means 46 does sense the light being emitted from the light source 44.

Mounted on the front wall 16 of the housing 12 is a push-button on switch 48 and a similar push-button off switch 50 which, of course, function in the known manner for turning the entire device on and off, respectively. A toggle switch 52 is also provided so that the automatic shutoff safety feature of the invention may be incorporated into the circuitry or disconnected therefrom as desired by operation of the switch 52. Also mounted on the front wall 16 is a light emitting diode 54 which will remain lit while the soldering iron is being heated to operating temperature and a light emitting diode 56 which will turn on after the iron has reached the proper temperature. A transducer 58 mounted in the center of the front wall 16 is also provided for generating an audible alarm when the soldering iron reaches operating temperature.

The "iron ready" timing circuit is shown schematically in block form in FIG. 3. Preliminarily, the amount of time necessary for the particular soldering iron 34 to heat up to operating temperature must be determined. Normally this is no more than several minutes and the predetermined time duration is then preset into timer 60. It would also be possible to merely preset timer 60 with some predetermined time duration such as five minutes or the like when the device is being manufactured which time duration should be sufficient to allow substantially any soldering iron to heat up to operating temperature. In either case, when on switch 48 is depressed, power from the power supply 62 is provided to the soldering iron 34. At the same time, switch 48 initiates timer 60 which initially activates the "not ready" LED 54. After the predetermined time duration which has been preset in the timer 60 has passed, the timer circuit extinguishes LED 54 and activates the "ready" LED 56. Simultaneously therewith, the audible alarm 58 is activated. Preferably, the audible alarm will sound for only five or six seconds although it might be possible to allow the alarm to continue to sound until the operator turns the alarm off. Preferably, the "ready" LED 56 will remain on at all times after the predetermined time duration has passed as measured by the timer 60.

FIG. 4 is a schematic block diagram of the automatic shutoff safety feature of the invention. This circuit includes a timer 64 which is preset to some predetermined time period, such as two hours, which is greater than the time duration measured by timer 60. The timer is first initiated when the on switch 48 is depressed turning the power supply 62 on thereby heating the iron 34. If the soldering iron is not used, the timer continues to count until the two hours have passed, at which time the timer 64 disables the power supply 62. This can be accomplished in any one of a number of conventional manners such as removing the power to a relay which had been set by the switch 48.

The iron use sensor, however, can prevent the timer 64 from timing out and turning the power supply off. Referring back again to FIGS. 1 and 2, it can be seen that when the iron 34 is lifted from the support, light from the light source 44 is sensed by the light responsive device 46. A signal from the light responsive device 46 which is part of the iron use sensor activates the reset circuit 68 which resets the timer each time the iron is lifted from the support. Of course, this circuit can be bypassed by use of the switch 52. It should, therefore, be readily apparent that each time the soldering iron 34 is lifted from the support means, timer 64 is reset so that the two-hour time period begins to run again. And thus, the power supply will not be turned off unless the soldering iron 34 remains idle in the support means for the full two-hour time period or some other preselected time period.

The present invention may be embodied in other specific forms without departing from the spirit or essential attributes thereof and accordingly, reference should be made to the appended claims rather than to the foregoing specification as indicating the scope of the invention. By way of example and not limitation, the iron use sensor 42 could be comprised of a Hall effect transistor located adjacent the metal parts of the soldering iron which would sense the presence thereof. It could also be possible to utilize a mechanical or magnetic switch which would be responsive to the weight or presence of the soldering iron in the support means.

I claim:

1. A soldering iron holder including:
a substantially rectangular box-shaped housing;
support means mounted on said housing for supporting an electric soldering iron thereon;
switch means carried by said housing for applying electrical power to a soldering iron so supported to thereby heat the same;
indicator means carried by said housing;
a first timing circuit, said first timing circuit being activated upon initiation of said switch means and being connected to said indicator means such that said indicator means is activated after a predetermined and preset time duration as measured by said first timing circuit to indicate readiness of the iron for use;
means for deactivating said switch means including means for sensing the removal of the iron from said support means and a resettable second timing circuit which deactivates said switch means after a predetermined time period greater than said time duration has been measured, said sensing means resetting said second timing circuit each time the iron is removed from said support means whereby the iron is turned off whenever it has not been in use and remains on said support means for said predetermined time period.

2. A soldering iron holder as claimed in claim 1 wherein said indicator means includes a light means for giving a visual indication that the iron is ready.

3. A soldering iron holder as claimed in claim 1 wherein said indicator means includes a means for audibly indicating when the iron is ready.

4. A soldering iron holder as claimed in claim 1 wherein said sensing means includes a light source and a light responsive device.

* * * * *